US012630091B2

(12) United States Patent
Guo

(10) Patent No.: US 12,630,091 B2
(45) Date of Patent: May 19, 2026

(54) ELECTRIC POWERED SIDE STEP ASSEMBLY FOR A VEHICLE

(71) Applicant: BOLD PICKUP PARTS INC.,
Vancouver (CA)

(72) Inventor: Fu Guo, Vancouver (CA)

(73) Assignee: BOLD PICKUP PARTS INC.,
Vancouver (CA)

( * ) Notice: Subject to any disclaimer, the term of this
patent is extended or adjusted under 35
U.S.C. 154(b) by 293 days.

(21) Appl. No.: 18/533,801

(22) Filed: Dec. 8, 2023

(65) Prior Publication Data

US 2025/0187546 A1     Jun. 12, 2025

(51) Int. Cl.
B60R 3/02          (2006.01)
(52) U.S. Cl.
CPC ...................................... B60R 3/02 (2013.01)
(58) Field of Classification Search
CPC ........... B60R 3/02; B60R 3/005; B60R 3/007
See application file for complete search history.

(56) References Cited

U.S. PATENT DOCUMENTS

| | | | |
|---|---|---|---|
| 3,608,957 | A | 9/1971 | Maneck |
| 3,887,217 | A | 6/1975 | Thomas |
| 5,268,358 | A | 12/1993 | Fretto |
| 5,358,268 | A | 10/1994 | Hawkins |
| 5,842,709 | A | 12/1998 | Maccabee |
| 6,641,158 | B2 | 11/2003 | Leitner |
| 6,963,049 | B1 | 11/2005 | Martin |

| | | | |
|---|---|---|---|
| 7,367,574 | B2 | 5/2008 | Leitner et al. |
| 7,469,916 | B2 | 12/2008 | Watson |
| 8,833,781 | B2 | 9/2014 | Hayes |
| 9,302,626 | B2 | 4/2016 | Leitner et al. |
| 9,527,449 | B2 | 12/2016 | Smith |
| 10,106,088 | B2 | 10/2018 | Smith |
| 10,272,842 | B2 | 4/2019 | Du et al. |
| 10,427,607 | B2 | 10/2019 | Otacioglu et al. |
| 11,077,802 | B2 | 8/2021 | Long et al. |
| 11,083,051 | B2 * | 8/2021 | Dellock .................. B60R 3/002 |

(Continued)

FOREIGN PATENT DOCUMENTS

| | | | | |
|---|---|---|---|---|
| CN | 113232592 A | * | 8/2021 | .............. B60R 3/02 |
| CN | 215154291 U | | 12/2021 | |

(Continued)

*Primary Examiner* — John D Walters
(74) *Attorney, Agent, or Firm* — BACON & THOMAS, PLLC

(57)          ABSTRACT

An extendable and retractable drop step positioned below a door of a vehicle to assist a person in climbing into the vehicle includes a power transmission mechanism for moving the drop step to and from an extended position, and a guiding arrangement for guiding the drop step along an inclined linear path from the retracted to the extended position. Loads on the extended step are borne by supports fixed to the vehicle, and not by the power transmission components. The step is extended and retracted along the inclined linear path in response to rotation of a motor shaft in a first direction to extend the step and rotation of the motor shaft in an opposite direction during retraction, ensure smooth and reliable operation. In addition, extension and retraction of the step can be controlled through a mobile app or Infotainment system interface, via an electronic control unit of the vehicle.

18 Claims, 11 Drawing Sheets

(56)        References Cited

U.S. PATENT DOCUMENTS

| 11,945,405 B2 * | 4/2024 | Chen | B60R 3/02 |
| 2023/0382306 A1 * | 11/2023 | Brick | B60R 3/02 |

FOREIGN PATENT DOCUMENTS

| JP | 63-255144 A | 10/1988 |
| TW | M296187 U | 8/2006 |
| TW | M318551 U | 9/2007 |
| WO | WO/03039910 A1 | 5/2003 |

* cited by examiner

26

28

ELECTRIC POWERED SIDE STEP ASSEMBLY FOR A VEHICLE

BACKGROUND OF THE INVENTION

1. Field of the Invention

The present invention relates to a side step positioned below a door of a vehicle, to assist a person in climbing into the vehicle by providing a step between the ground and the floor of the vehicle. The side step is retracted when not in use, and extendable when a person wishes to enter the vehicle.

The electric powered side step of the invention decouples the step-extending and retracting power transmission mechanism from the guiding and load bearing mechanism, so that loads on the extended step are borne by supports fixed to the vehicle, and not by the power transmission components. The step is extended and retracted along a linear path in response to rotation of a motor shaft in a first direction to extend the step and rotation of the motor shaft in an opposite direction during retraction, ensure smooth and reliable operation. In addition, extension and retraction of the step can be controlled through a mobile app or Infotainment system interface, via an electronic control unit of the vehicle. Additional features of the electric powered side step of the invention include, by way of example and not limitation, the provision of an electric heater to melt snow and ice, and further improvements in the step's power transmission and guiding mechanisms. The principles of the invention may be applied to a single step, or a pair of synchronously-operated steps.

2. Description of Related Art

Side steps or running boards are steps that are placed on the exterior of a vehicle, between the doors of the vehicle and the ground, to assist a driver or passenger in entering and leaving the vehicle. Such steps are helpful when the vehicle has a high ground clearance. However, because the conventional fixed side step extends from the side of the vehicle, it can be struck by the door opening of an adjacent vehicle, scrape against a high curb, tree, or other curbside obstruction, or be exposed to damage during off-road use of the vehicle. In addition, a relatively short user might still have difficulty in reaching the step if the step is too far from the ground, or in entering the vehicle from the step if the step is positioned too low, while a relatively tall user of the conventional fixed side step might bump his or her head while climbing into the vehicle cab if the step's position is too high.

Too solve the problem that a laterally extending step is vulnerable to damage while the vehicle is moving or during parking, numerous proposals have been made to enable retraction of the step when not required to enter or exit the vehicle. The proposals include both purely mechanical and electric powered extension/retraction mechanism. For example, an early example of a mechanically-retractable running board for a vehicle is disclosed in U.S. Pat. No. 3,608,957. The running board is coupled to the sliding door of a passenger van, and extends using a swinging mechanism coupled to the sliding door, so that the running board extends when the sliding door is opened. A spring holds the running board in a retracted position when the door is closed.

More common are proposals to power the side step by an electric motor, which is easier to operate and is not vulnerable to misalignment between the mechanism and the door. The conventional electric powered side steps can be categorized into three types:

Type 1: The extension and retraction of the step is enabled by an electric motor and connected swinging mechanism, with a horizontally placed sliding cylinder;

Type 2: The extension and retraction of the step is enabled by an electric motor and a connected four-rod linkage mechanism;

Type 3: The extension and retraction of the step is enabled by an electric motor and a connected swinging or pivoting mechanism.

Drawbacks of the first type of electric powered retractable side step include the following:

1) because the direction of the step motion is perpendicular to the direction of the sliding cylinder, there exists a theoretical dead point in the motion, which leads to the entire mechanism getting stuck or requiring excessive starting torque;

2) conventional electric powered steps of this type rely on motor control or the swinging mechanism to establish the extended position of the step, leading to deviations in the step's trajectory and operational errors, making it difficult to ensure that the step remains in the correct extended position; and 3) conventional retractable steps of this type have limited functionality and lack intelligent control features.

Drawbacks of the second type of conventional electric powered retractable side step include the following:

1) because the side step serves both the purpose of providing a stepping surface and as the connection and torque transmission device, even the slightest surface deformation due to stepping may result in operational errors such as getting jammed, misalignment between the front and rear steps, and not extending or retracting properly; and 2) the conventional steps of this type also have limited functionality and lack intelligent control features.

Drawbacks of the third type of conventional electric powered retractable side step include the following:

1) because the third type of electric powered side step utilizes a swinging mechanism to deploy its stepping surface, the swinging mechanism and step bearing a user's weight while also serving as components of the torque transmission mechanism, the side step extension and retraction mechanism is easily prone to deformation, getting jammed, or not being able to retract or extend properly, as well as lack of synchronization between front and rear steps if multiple steps are provided; and 2) the conventional steps of this type also have limited functionality and lack intelligent control features.

Many of the conventional side steps utilize a rotating shaft and crank mechanism to transmit the torque supplied by the motor to the swinging, linkage, or pivoting components that guide movement of the step into the extended and retracted positions. The present invention also can use a rotating and crank mechanism to transmit torque from the motor, but in a way that separates the torque transmission functions from the guiding and support functions, so that the loads on the step are not borne by the torque or power transmission components. Specific examples of conventional electric powered side step assemblies in which power transmission is achieved through rather than separately from the guiding and support components, include the following:

U.S. Pat. No. 3,887,217 discloses an electrically powered step in which the step is extended by a rotating shaft and crank mechanism coupled to a linkage mechanism consisting of hinged arms, and in which the crank mechanism also serves to bear the weight of the step. The crank mechanism converts rotational motion of the motor shaft into movement of the linkage or swinging mechanism that guides movement of the step. The crank is connected to one of the swinging or linkage arms to cause movement of the arms. As a result, in this arrangement, not only is the weight of the step borne by the swinging or linkage mechanism, but also by the motor shaft.

U.S. Pat. No. 5,358,268 discloses an alternative to a swinging or four arm linkage in which movement of the step is guided by a curved slot and follower that is hinged to the step, with both the actuator and guide arrangement being coupled to the center of the step. Despite replacement of a swinging arrangement or four arm linkage with a curved slot and follower, the electric powered step described in this patent is still vulnerable to deformation and jamming due to use of the power transmission components for guidance and support of the step in the extended position.

Other prior patents that disclose electric powered side steps that fail to separate power transmission and guiding support functions or components include U.S. Pat. Nos. 9,527,449, 9,302,626, 7,367,574, 6,641,158, and 5,842,709, and PCT Publication No. WO 03/039910, which all disclose similar step assemblies supported by arms that pivot in a direction perpendicular to the vehicle, with torque supplied by a rotating shaft via a crank member and a slot in one of the arms, and U.S. Pat. No. 8,833,781, which discloses a step with crank-driven support arms that pivot in a direction parallel to the side of the vehicle, and that retract into a vehicle protecting rocker guard position. U.S. Pat. No. 9,302,626 also discloses a control system, but the control inputs are only disclosed as vehicle control signals such as the ignition switch, a door switch, or door opening signals from a key fob, as opposed to the present invention's intelligent control through an app or a vehicles Infotainment system.

Variations of the conventional electric powered side step systems described above are also disclosed in Chinese Patent Publication No. 201822215782.7, which describes a step extension and retraction arrangement that uses a support arm pivotable in a plane perpendicular to the vehicle, with motion limited by a curved guide slot similar to the one disclosed in U.S. Pat. No. 5,268,358, discussed above, and Japanese Patent Publication No. 63-255144, which discloses an alternative extension mechanism including pivoting swing arms.

Additional variations are disclosed in U.S. Pat. Nos. 10,427,607 and 11,077,802, which are both directed to electric powered side step arrangement in which the steps supported by arms that pivot in a horizontal plane, while U.S. Pat. No. 7,469,916 discloses a step that is hinged to a mechanism that extends and retracts in a horizontal rather than inclined plane, is actuated by a rack and pinion mechanism, and in which the step pivots about the hinge in response to the horizontal actuation. In addition, a rack and pinion driven step with no pivoting that extends in a horizontal rather than inclined direction appears to be disclosed in Taiwan Patent Publication Nos. M296187 and M318551, while Chinese Patent Publication No. CN 215154291 discloses a synchronously driven pair of front and rear steps.

A prior system that includes two extendable steps is disclosed in U.S. Pat. No. 10,106,088, although unlike the dual-step arrangements of the exemplary embodiments of the present invention, the front and rear steps separately driven through dual arm linkage mechanisms.

With respect to the feature of electronic control of step operation, U.S. Pat. No. 9,527,449 discloses an electric powered step that is extended upon detection of a door opening, and in which the door status information is obtained from a digital communication bus of the vehicle, via a pre-existing connector of the vehicle and a wired connection to the extension motor, while U.S. Pat. No. 10,106,088 discloses extension and retraction of a side step in response to receiving information from a vehicle interface, and in particular door opening status and speed information provided by signals from a key FOB, vehicle ignition, or vehicle transmission controller (Park or Drive). These systems lack the intelligent control features, such as adjustability, that are included in exemplary embodiments of the present invention.

Finally, by way of further background, U.S. Pat. No. 10,272,842 discloses and claims the feature of "gesture control" of step extension using a capacitive sensor that senses the proximity of a user's foot, while U.S. Pat. No. 6,963,049 discloses heating surfaces of a vehicle to melt ice and snow, but does not discloses a retractable side step or running board.

SUMMARY OF THE INVENTION

It is accordingly an objective of the invention to provide an electric powered step assembly for a vehicle that has increased reliability and service life.

It is a second objective of the invention to provide an electric powered side step assembly that is eliminates the disadvantages of conventional electrically powered side step assemblies, such as getting jammed while moving, failing to move into the correct position, inconsistent movement trajectory, lack of synchronization between the front and rear steps, and limited functionality.

It is a third objective of the invention to provide a side step assembly with a power transmission mechanism that is separate from the load-bearing components, so that loads on the step cannot cause mis-alignment of the of the power transmission.

It is a fourth objective of the invention to provide a side step assembly for a four door vehicle that includes both front and rear steps are moved synchronously by a single motor and rotating shaft, and separate torque transmission mechanisms, avoiding misalignment.

It is a fifth objective of the invention to provide an electric powered crank-driven step assembly for a vehicle in which the crank is reversible and therefore does not have a deadpoint.

It is a sixth objective of the invention to provide an electric powered side step with intelligent safety and control features such the ability to detect an obstacle in the path of movement of the side step in order to prevent a collision by terminating extension or retracting the step, and/or the ability to heat the step in order to melt accumulated snow and ice.

These and other objectives of the invention are achieved, in exemplary embodiments of the invention, by an electrically powered side step or side step assembly that uses a unique connection and movement mechanism in which the stepping surface is separate from the torque transmission system so that the transmission system is isolated from forces resulting from forces generated when a person climbs onto or stands on the step. To support the step and isolate it from the torque transmission system, the electric powered side step of the exemplary embodiments includes two types of limit positioning mechanism to ensure that the extending and retracting movements are more dependable and stable, and to increase the mechanical rigidity of the system so that it is less likely to have deformations or operational errors.

The step is guided along an inclined linear path defined by a track or inclined guide member. Limit positioning stops are provided at the lower end of the track or inclined guide member so that sliding guide blocks or other structures that move with the step engage the limit positioning stops upon movement of the step to the extended position. Since the limit positioning stops are fixed to static structures supported by the vehicle, any force on the step is also borne by the vehicle and not by the torque transmission system. Further stability may be provided by including pivotal side arms consisting of cylinders, cylinder rods, and hinges oriented at the same angle as the angle of incline of the linear extension/retraction path.

To eliminate the dead point issue, the electric motor included in the exemplary embodiments may be driven in a first direction to extend the step, and in a reverse direction to cause the step to retract.

In addition, the side step of the exemplary embodiments may optionally configured to enhance safety by adding a device for melting ice and snow on the surface of the drop step. During snowy conditions, users can utilize the mobile app or in-car infotainment system to activate the snow melting function. This feature eliminates ice and snow on the step and prevents people from slipping and falling when stepping on it, thereby increasing safety.

The side step of the exemplary embodiments may further enhance safety by incorporating distance sensors to provide obstacle detection feedback. When the extension mechanism detects external obstacles, it can promptly stop or retract the step, preventing damage to the step of the mechanisms that move and/or guide the step, and thereby enhancing user safety.

These and other advantages of the invention may be understood in connection with the following description of exemplary embodiments of the invention, with reference to the appended drawings.

Figure 1:
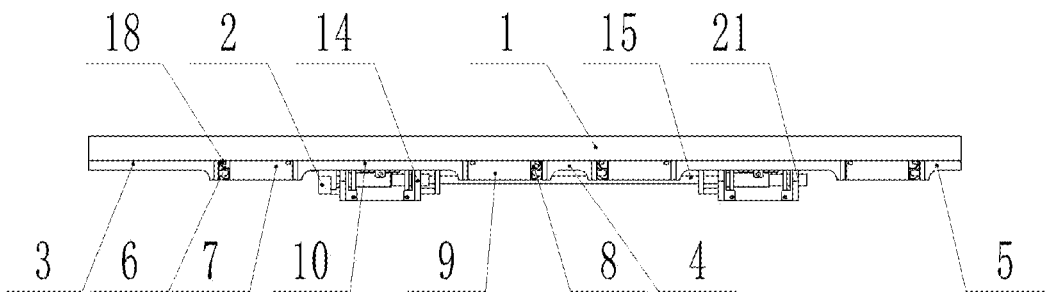
FIG. 1 is a front view of an electric powered side step assembly constructed in accordance with the principles of a first exemplary embodiment of the present invention, with the steps in a retracted state.
Figure 2:
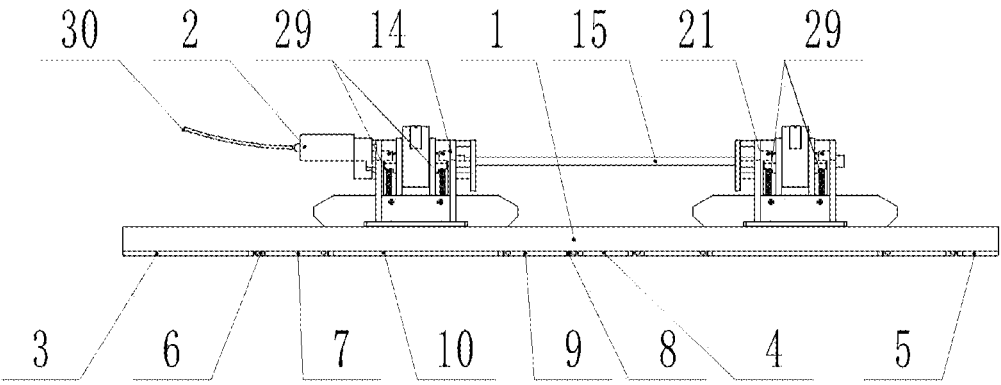
FIG. 2 is the top view of the electric powered side step assembly of FIG. 1.
Figure 6:
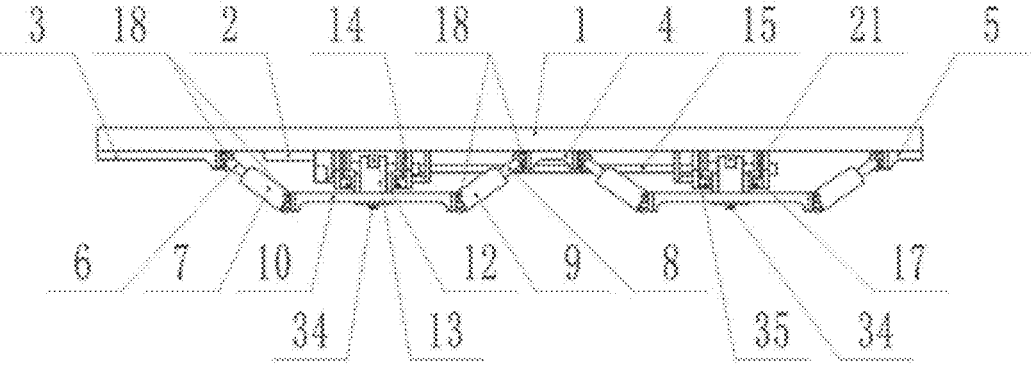
FIG. 6 is a front view of the electric powered side step assembly of FIG. 1, with the steps in an extended state.
Figure 6A:
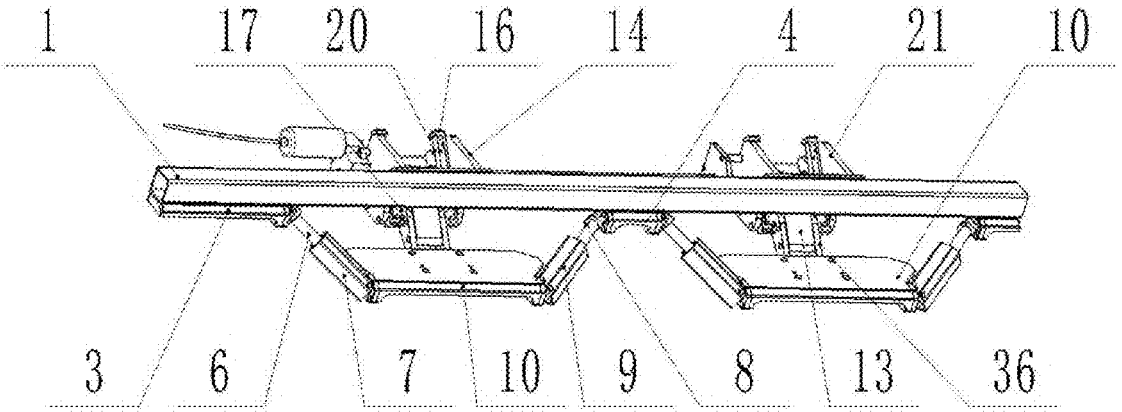
FIG. 6A is an isometric view of the electric powered side step assembly in the extended state shown in FIG. 6.
Figure 6B:
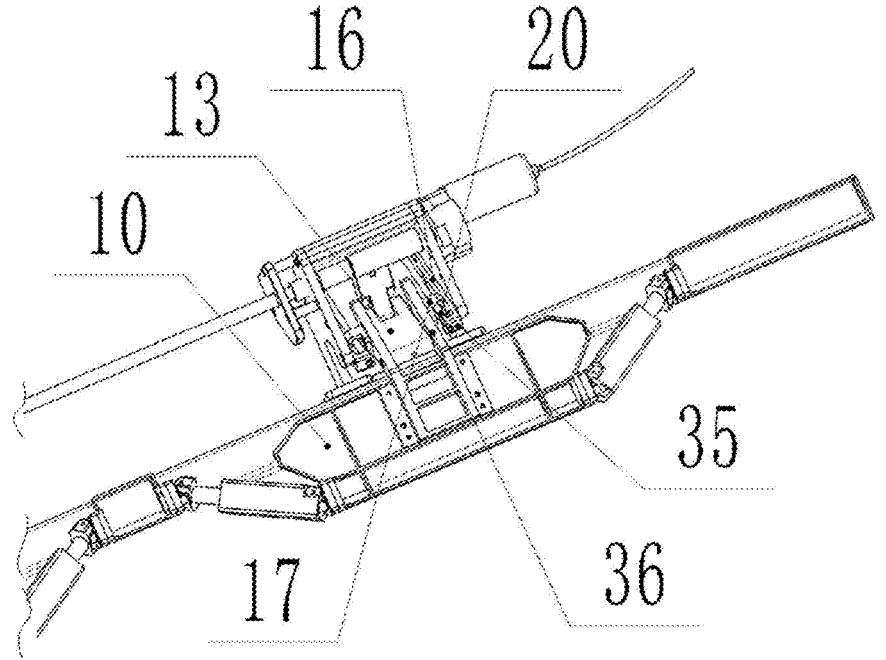
FIG. 6B is a bottom view of the left side step shown in FIG. 6, in a retracted state.
Figure 7:
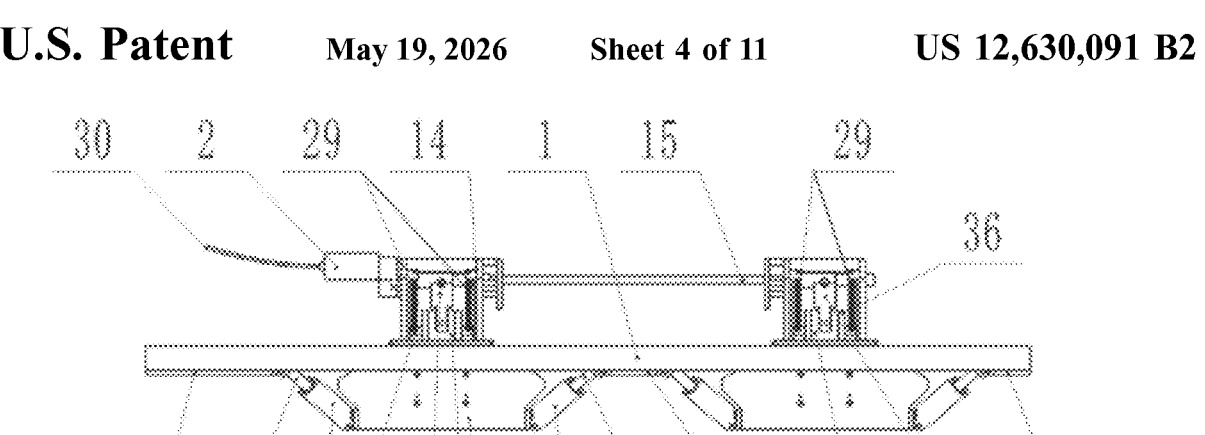
FIG. 7 is a top view of the extended electric powered side step assembly shown in FIG. 6.
Figure 10:
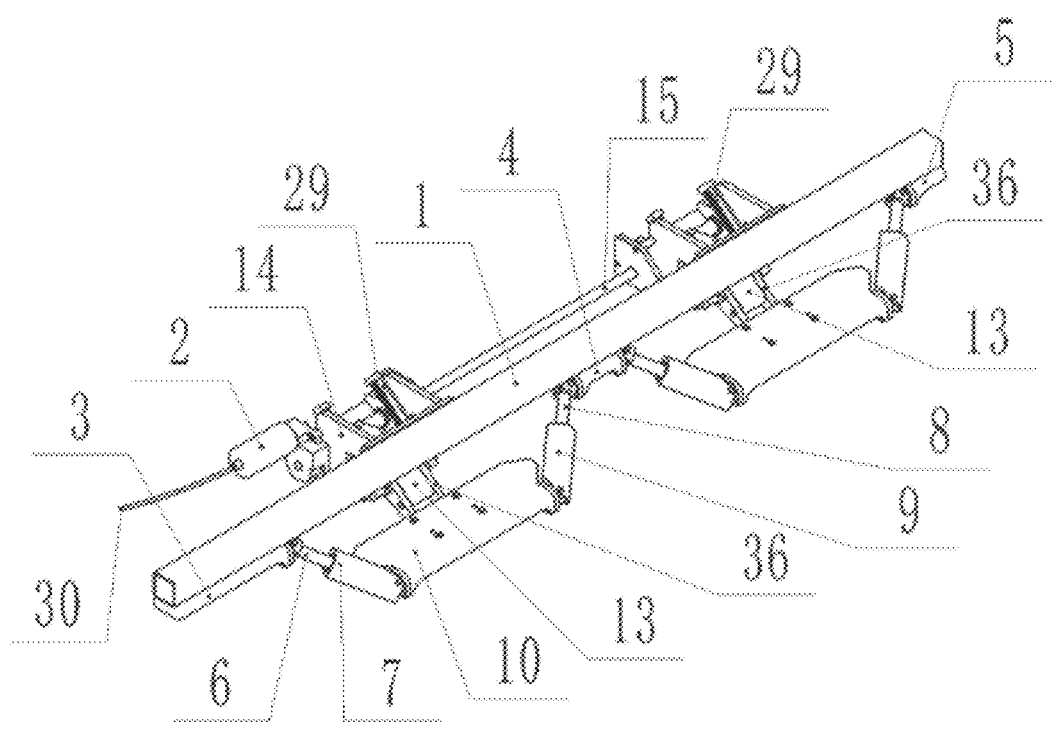
Figure 11:
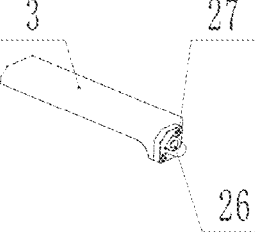
Figure 12:
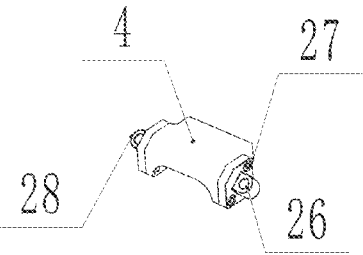
Figure 13:
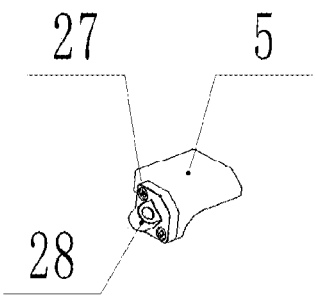
Figure 14:
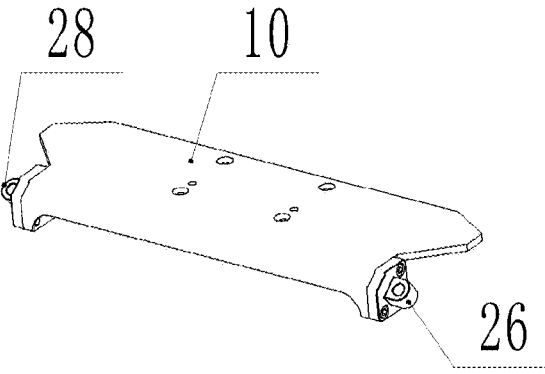
Figure 15:
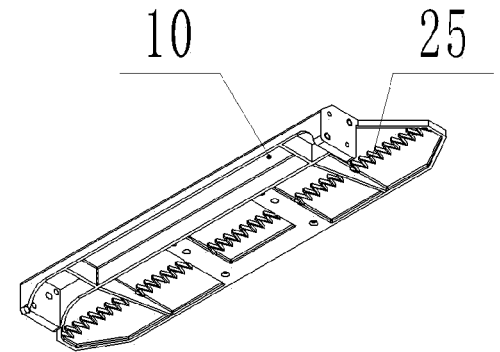
Figure 16:
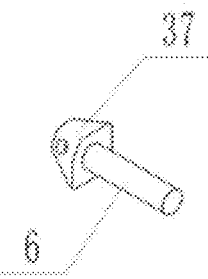
Figure 17:
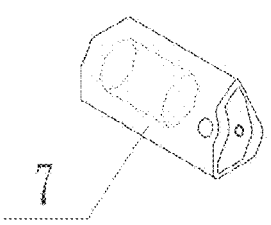
Figure 18:
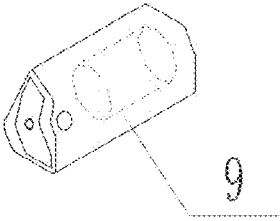
Figure 19:
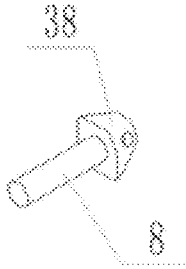
Figure 20:
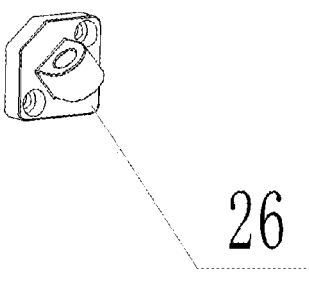
Figure 21:
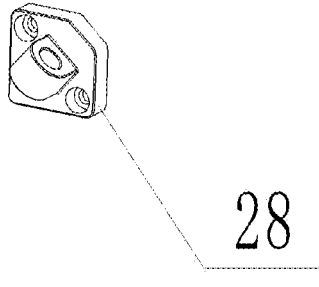
Figure 22:
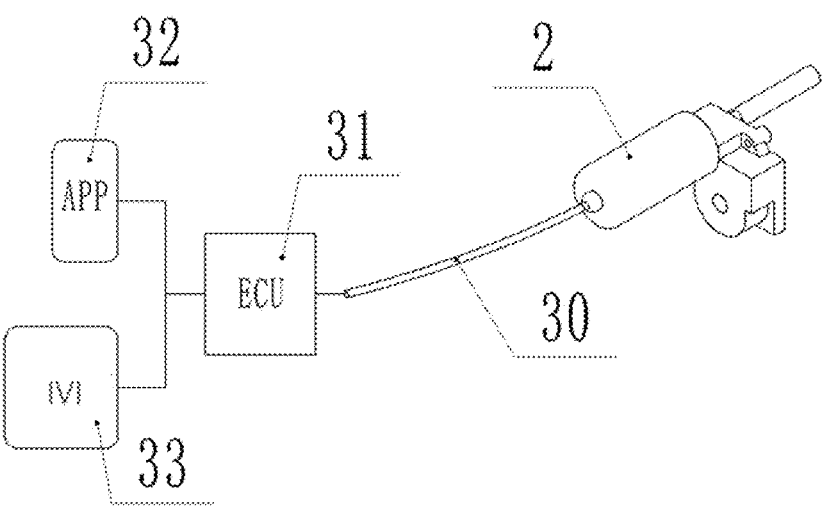
Figure 23:
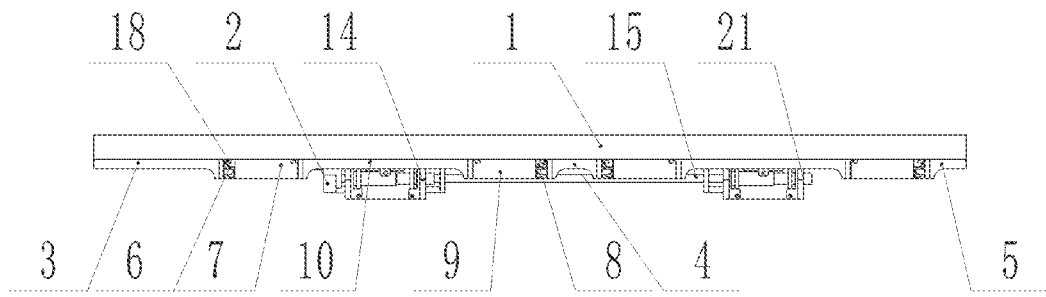
Figure 24:
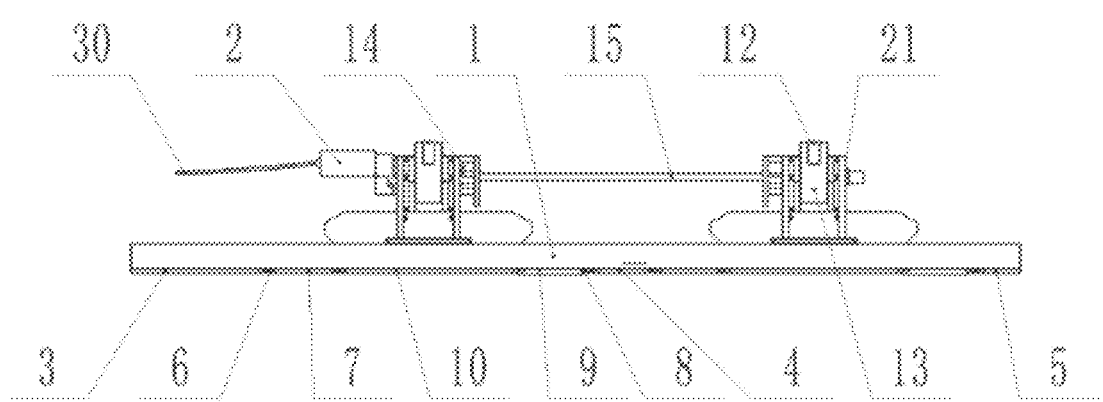
Figure 25:
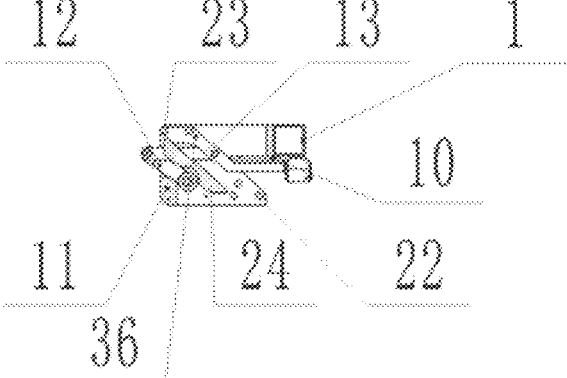
Figure 26:
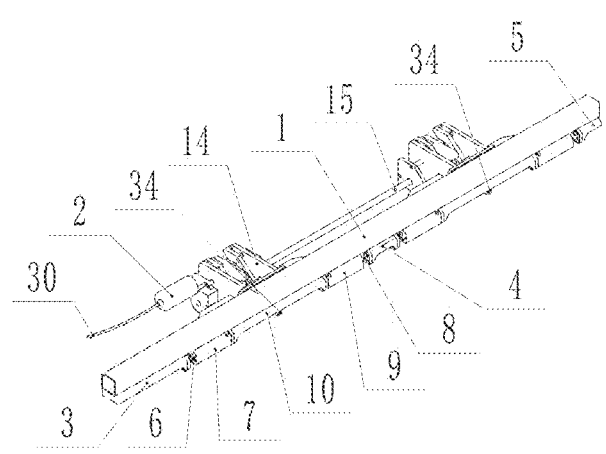
Figure 27:
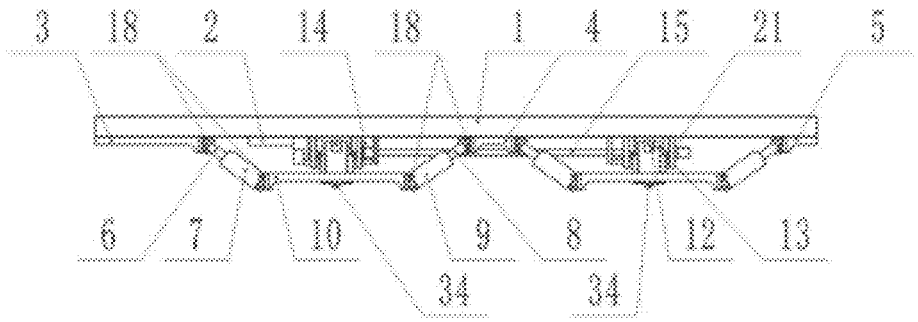
Figure 28:
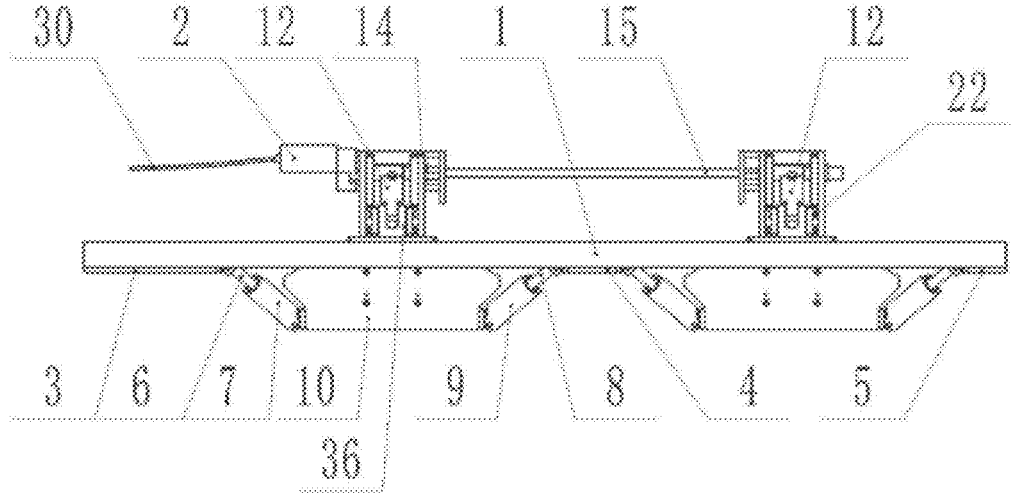
Figure 29:
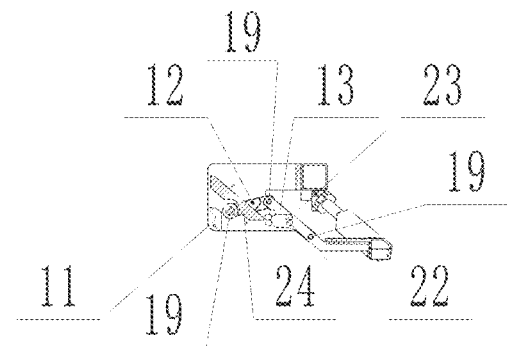
Figure 30:
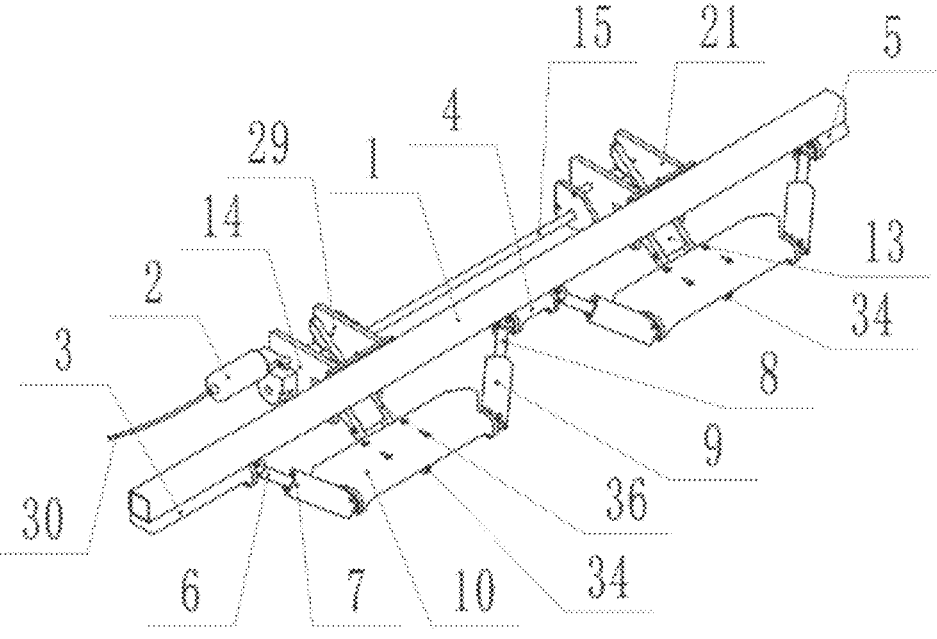

6, illustrating a crank mechanism for driving a linearly guided slider between extended and retracted positions;

FIG. 10 is an isometric view of the extended electric powered side step assembly shown in FIG. 6;

FIG. 11 is an isometric view of a left side swing arm support member for use in the exemplary embodiment of FIG. 1;

FIG. 12 is an isometric view a center swing arm support member for use in the exemplary embodiment of FIG. 1;

FIG. 13 is an isometric view of a center swing arm support member for use in the exemplary embodiment of FIG. 1;

FIG. 14 is top view showing a stepping surface of a step of the exemplary embodiment of FIG. 1;

FIG. 15 is a bottom view of the step of FIG. 14;

FIG. 16 is an isometric view of a left side inclined cylinder rod for use in the exemplary embodiment of FIG. 1;

FIG. 17 is an isometric view of a left side inclined cylinder for use in the exemplary embodiment of FIG. 1;

FIG. 18 is an isometric view of a right side inclined cylinder rod for use in the exemplary embodiment of FIG. 1;

FIG. 19 is an isometric view of a right side inclined cylinder for use in the exemplary embodiment of FIG. 1;

FIG. 20 is isometric view of a left side hinge block for use in the exemplary embodiment of FIG. 1;

FIG. 21 is isometric view of a right side hinge block for use in the exemplary embodiment of FIG. 1;

FIG. 22 is a schematic diagram of a circuit for controlling the step assembly of FIG. 1;

FIG. 23 is a front view of an electric powered side step assembly constructed in accordance with the principles of a first exemplary embodiment of the present invention, with the steps in a retracted state;

FIG. 24 is a top view of the electric powered side step assembly of FIG. 23;

FIG. 25 is a left side view of the electric powered side step assembly of FIG. 23;

FIG. 26 is an isometric view of the electric powered side step assembly of FIG. 23, with the steps in a retracted state;

FIG. 27 is a front view of the electric powered side step assembly of FIG. 23, with the steps in an extended state;

FIG. 28 is a top view of the extended electric powered side step assembly shown in FIG. 27;

FIG. 29 is a left side view of the extended electric powered side step assembly shown in FIG. 27;

FIG. 30 is an isometric view of the extended electric powered side step assembly shown in FIG. 26.

DETAILED DESCRIPTION OF THE PREFERRED EMBODIMENTS

FIGS. 1-22 show an electric powered side step assembly according to a first exemplary embodiment of the present invention. The electric powered side step assembly of this embodiment of the invention includes a power transmission mechanism, a separate step guiding mechanism for guiding a step along a linear path, limit stops for defining an extended position of the step and for bearing a load on the step, and an intelligent control system.

As shown in FIGS. 1-6, 6A, 6B, and 7-10, the electric powered side step assembly of the first exemplary embodiment of the invention includes a main support bar 1, which is fixed to the vehicle to provide support for the assembly. Although depicted as a hollow member with a square cross-section, the shape of the main support bar 1 may be varied by changing the shape or dimensions of the support to accommodate different configurations of the electric powered side step and/or to fit the vehicle onto which the electric powered step is installed.

In the exemplary embodiment of the invention, two drop steps (both indicated by reference numeral 10) are provided at positions corresponding to front and rear doors of the vehicle. It is also within the scope of the invention to provide a single drop step, for example for use on a two door vehicle. Each of the two drop steps 10 of the illustrated exemplary embodiment may be driven by an identical power transmission mechanism and guided by an identical guiding mechanism, with power to move the second drop step 10 being transmitted from a single motor 2 through a common shaft 15 to ensure that the two steps extend and retract synchronously. In the following description, identical parts of the two power transmission mechanisms and the two guiding mechanisms are referred to by the same reference numbers.

Figure 4:
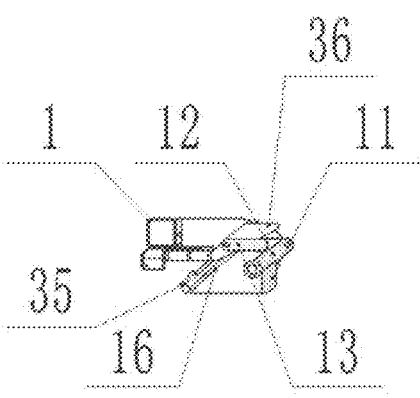
FIG. 4 is the right view of the electric powered side step assembly of FIG. 1.
Figure 5:
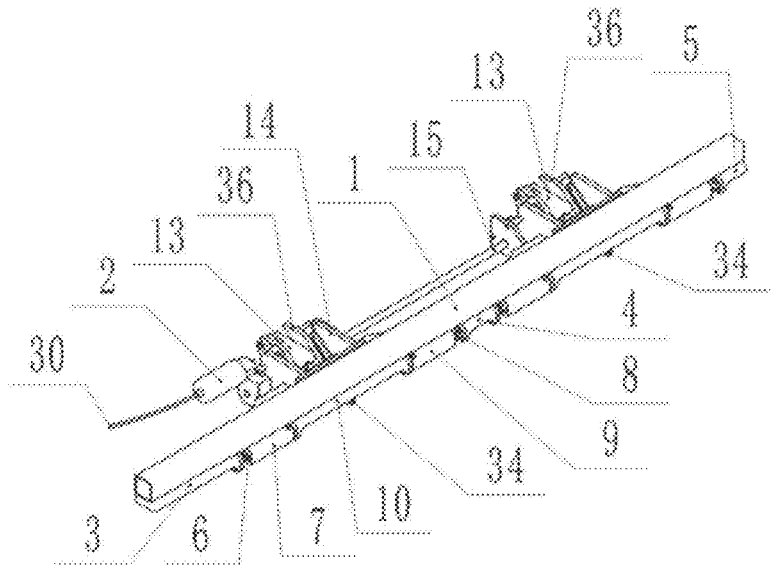
FIG. 5 is an isometric view of the electric powered side step assembly of FIG. 1, with the steps in a retracted state.
Figure 9:
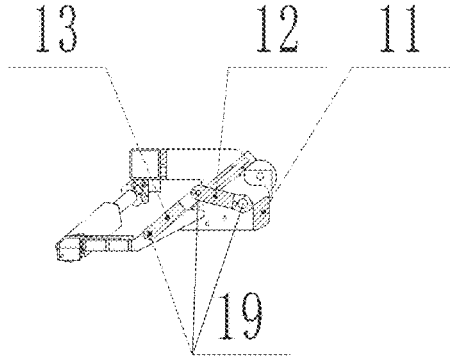
FIG. 9 is a right side view of a cross-section of the extended electric powered side step assembly shown in FIG.

Each power transmission mechanism is in the form of a crank mechanism that converts rotational motion of the motor 2 and motor shaft 15 into linear motion of the corresponding drop step 10. As best illustrated in FIGS. 4 and 9, the crank mechanisms of the first exemplary embodiment each include a driving arm 12 and a driven arm 13. A first end of driving arm 12 is fixed to and rotates with shaft 19, shaft 15, and/or an appropriate transmission gear or gears (not shown). A second end of the driving arm 12 is pivotally connected to driven arm 13, which in turn is pivotally connected at a second end to a drop step extension 36 that extends rearwardly and upwardly from each of the drop steps 10. Step extension 36 which may formed in one piece with the drop step 10, or consist of separate plates welded or otherwise fixed to the main horizontal section of the step 10 so that the step extension 36 is connected to and moves with the corresponding step 10.

The drop step 10 is guided by a pair of tracks 16, in which are mounted guide rods 20, that define an inclined linear path for movement of the drop step 10 to and from an extended position. Step extensions 36 are also fixed to sliding guide blocks 17, which project in lateral directions from the step extensions 36, and include cylindrical openings for receiving guide rods 20. The slide blocks 17, step extensions 36, and steps 10 are guided along an inclined linear path defined by sliding interaction between the slide blocks 17 and the guide rods 20. As a result, the drop step extension 36 and drop step 10 are constrained to move linearly at the incline angle. The incline angle may be determined by the height of the vehicle and a desired extension distance. For a typical high ground clearance vehicle such as a truck or SUV, a suitable incline angle is 40°, although the incline angle may be varied depending on the ground clearance of the vehicle and the distance to the floor of the cab.

Figure 3:
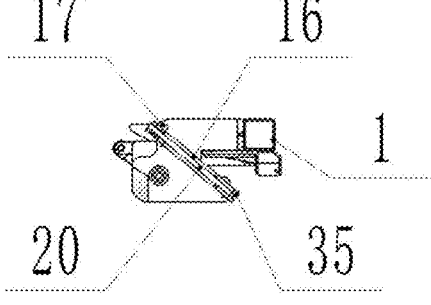
FIG. 3 is the left view of the electric powered side step assembly of FIG. 1.
Figure 8:
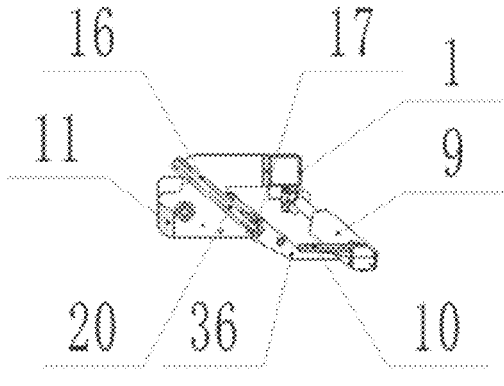
FIG. 8 is a left side view of the extended electric powered side step assembly shown in FIG. 6.

At the lower ends of tracks 16 and guide rods 20 are limit stops 35 define the extended position of the steps and support any load on the steps. The tracks 16 and limit stops 35 are fixed to respective pairs of driven and driving side base plates 14 and 21, each of which is fixedly secured to the main support bar 1. As best illustrated in FIGS. 3 and 8, limit stops 35 at the lower end of the tracks 16 positively determine a final extended position of the drop steps 10. Since the guide mechanism is fixed to the plates 14 and 21 and main support bar 1, any load on the steps 10 is borne by the main support bar 1, and is not transmitted to the crank mechanism or motor shaft.

To ensure that each drop step is smoothly guided along the linear path defined by the tracks 16 during extension and retraction, additional supports in the form of cylinders 7,9 and cylinder rods 6,8 may be pivotally coupled between sides of the drop steps 10 and support members 3-6 fixed to the main support bar 1. The pivot hinges 26 and 28 are angled to permit pivoting of the cylinder rods 6,8 and cylinders 7,9 in an inclined plane that corresponds to the inclined plane defined by tracks 16, allowing the cylinder rods and cylinders to follow the trajectory of the steps. Cylinder rods 6,8 may include pivot joints 37,38 that are coupled to the pivot hinges 26,28 by axles, pivot pins, or the like.

The electric motor 2 that powers the drop step assembly is connected by a wiring kit 3 to a controller or processing unit included in the vehicle. Motor 2 drives a shaft 19 either directly or through a transmission. Shaft 19 in turn is connected to a first crank mechanism that extends and retracts drop step 10 as it is guided by an adjustable linear, sloping, guide mechanism. The first crank mechanism is connected to the connecting shaft 15, which rotates in response to rotation of the first crank mechanism, and which is connected to the second, otherwise identical, crank mechanism.

Counterclockwise rotation of the driving arm 12 is limited by a driving rod position stopper 11, which engages the driving arm 12 to prevent further clockwise rotation of the driving arm 12 when the step is in a retracted position, as shown in FIG. 4. Downward and outward movement of the drop step extension 36, on the other hand, is limited by engagement between guide blocks 17 extending from both sides of the drop step extension 36 and limit stops 35 at the lower ends of a bracket 36 that holds the guide rods that form tracks 16. The position of guide block 17 on the drop step extension 36 determines the point at which the step 10 is extended, with the engagement between a guide block 17 and corresponding limit stop 35 providing a load-bearing means for the drop step 10. As explained above, because the weight of the step is borne by the limit stop 35, which is fixed to driving side base plate 14 or driving side base plate 21, any load on the drop step 10 is borne exclusively by the limit stop 35, base plates 14 and 21, and support bar 1, and the crank mechanism does not bear any load.

Optionally, anti-dust sleeves 29 may be provided to enclose the guiding rods of tracks 16 and the sliding guide blocks 17, to ensure that movement of the drop step is not affected by ingress of dust or debris into the electric powered side step assembly.

Although the above-described guiding mechanism may itself be sufficient to guide movement of the step, auxiliary support may be provided by the above-mentioned angled hinges, cylinders and cylinder rods, which may have the following configuration: Affixed to the main support bar 1 are left swing arm support 3, center swing arm support 4, and right swing arm support 5, respectively shown in FIGS. 11-13. Each support includes a main body 40,41,42 affixed to the support bar 1 by welding, rivets, or any other fastening means that will occur to the skilled artisan. Left swing arm support 3 includes a left hinge block 26 having a projecting hinge 27 fixed to the main body 40 and to which the pivot joint 37 of a corresponding left inclined cylinder rod 6 is pivotally coupled. Center swing arm support 4 include a pair of hinge blocks 26 and corresponding projecting hinges 27 to which pivot joints 38,36 of a corresponding right inclined cylinder rod 8 and left inclined cylinder rod 6 of a second step are pivotally coupled. Right swing arm support 5 may include a hinge block 26 and hinge 27 to which the pivot joint 38 of a right cylinder rod 8 for the second step is pivotally coupled. Coupling may be effected by a coupling pin that extends through openings or eyes in the hinges 27, which are oriented at an inclined angle relative to horizontal to permit the cylinder rods 6 and 8 to pivot in a correspondingly inclined plane in response to movement of the corresponding steps 10 as the rod slides in and out with respect to the corresponding cylinders 7 and 9. The angle of the hinges is determined by the incline angle of the guiding mechanism to ensure that the trajectory of the drop step is fixed during extension and retraction. The angle between the right and left hinge blocks and the horizontal plane is the same as the angle between the guiding track 16 and the horizontal plane which, in the exemplary embodiment of FIGS. 1-22, is 40°.

It will be appreciated by those skilled in the art that the left and right hinges, cylinders, and cylinder rod structures may be varied to without departing from the scope of the invention, and may even be omitted. The purpose of the structures is facilitate movement of the step 10 by providing an auxiliary guiding function, but the principal support means are the linear tracks 16, described above. The rods and cylinders preferably do not affect the trajectory of the step, which is defined by the linear guide structure consisting of guide blocks 17 and tracks 16.

FIG. 10 also shows a distance sensor 34 positioned on the underside of drop step 10. The distance sensor 34 can detect obstacles to ensure that the drop step 10 does not encounter interference during movement into the extended position. If an obstacle is detected, the motor 2 can be controlled to cause the drop step 10 to promptly stop or retract, enhancing the safety of use.

The operation of the exemplary embodiment shown in FIGS. 1-22 is as follows: When the drop step 10 needs to extend downward and away from the side of the vehicle in an inclined or slanted manner, the power shaft of the electric motor 2 rotates clockwise, causing the driving arm 12 to also rotate in a clockwise direction. This movement pushes the driven arm 13 and the drop step 10 to move in a downward direction along the trajectory defined by the guiding mechanism, and in particular the interaction between sliding guide blocks 17 and guide rods 20. When the sliding guide block 17 contacts the limit stop 35 at the end of guiding track 16, it stops sliding, and the drop step 10 stops moving, reaching the final extended position. This arrangement achieves stability of the extension trajectory, and ensures correct positioning when the drop step extends.

When the drop step 10 needs to be retracted upwardly in an inclined or slanted manner, the power shaft of the electric motor 2 reverses, causing the driving arm 12 to rotate in the opposite direction. This movement causes the driven arm 13 and the drop step 10 to move in an upward and inward direction towards the side of the vehicle. Simultaneously, the sliding guide block 17 follows the movement of the drop step 10 and slides upward along the direction of the corresponding track 16. When the driving arm 12 touches the upper limit stop 11, the driving arm 12 stops rotating, and the drop step 10 has reached the retracted or closed position.

Those skilled in the art will appreciate that the illustrated track arrangement, which utilizes guide rods 20 extending at an inclined angle and complementary sliding guide blocks 17 extending from the steps 10 may be varied without departing from the scope of the invention, so long as the guiding arrangement limits movement of the step to a linear, or substantially linear, path defined and limited at one end by limit stops 35. In addition, the crank mechanism may be varied by so long as the power transmission function is separated from the guiding function so that loads on the step are not borne by the power transmission mechanism.

FIG. 15 shows a lower side of the drop step 10. Included in the drop step 10 is a heater coil 10, which may be activated to melt snow and ice on the step 10 and thereby prevent a user from slipping on the step when using it in the extended position to enter or leave a vehicle.

FIG. 22 schematically shows components for controlling the motor 2, and therefore movement of the step. Because of the rotation-limiting upper limit stop 11, the crank is prevented from executing a full 360° rotation. Instead, extension is accomplished by driving the motor in a first direction until guide block 17 engages limit stop 35, while retraction is carried out by reversing motor rotation until driving crank arm 12 engages the position stopper 11. This bi-directional motion of the motor and crank eliminates potential dead-stops in the cranking motion.

Bi-directional control of motor rotation to extend and retract the step can be accomplished through an electronic control unit (ECU) 31, such as the control unit 33 of the vehicle's infotainment system, which may be activated by a vehicle remote controller. Extension may be automatically carried out in response to opening of the corresponding vehicle door, or by a mobile phone app 32 wirelessly connectable to the ECU 31. Retraction may be initiated upon movement of the vehicle, placement of the vehicle in drive gear, opening and closing of the vehicle's doors, and/or upon detection of other factors. The vehicle Infotainment system or mobile app may be used to set the conditions under which extension or retraction of the step is initiated.

When extension of the side step assembly is desired, for example, when the vehicle door is unlocked or opened, the electric motor 2 installed on the driving side base 14 is powered, and starts to rotate in a clockwise direction. The driving arm 12 rotates in a clockwise direction via the movement of shaft 19. The driving arm 12, in turn, drives the driven arm 13 to rotate through shaft 39, causing the drop step 10 to move downward at the inclined angle defined by the track 16. The motion generated by the drop step 10 is transmitted through the left inclined sliding cylinder 7 and the right inclined sliding cylinder 9, causing the left inclined cylinder rod 6 and the right inclined cylinder rod 8 to slide out in coordination with the left inclined sliding cylinder 7 and the right inclined sliding cylinder 9.

The second drop step 10 may use a driving mechanism that is identical to the driving mechanism of the first drop step 10. When the electric motor 2 on the driving side base 14 rotates, it drives the second drop step 10 to extend downward at the inclined angle through the connecting shaft 15, allowing for synchronized extension of the front and rear steps. Simultaneously, when the driving arm 12 rotates, it drives the drop step 10 to move.

When the drop steps 10 have been extended downwards at the inclined angle, the sliding guide block 17 projecting laterally from drop step extension 36 follows the motion of the drop step 10 and slides downward along the direction of the track 16. When the sliding guide block 17 contacts limit stop 35 in the guiding track 16, it stops sliding, the drop step 10 completes its downward extension at the inclined angle. When retraction is desired, such as when the corresponding vehicle door is closed, the electric motor 2 installed on the driving side base 14 is powered and starts to rotate in reverse. This rotation is transmitted through the shaft 19, causing the driving arm 12 to rotate in the reverse direction. The driving arm 12, in turn, drives the driven arm 13 to rotate through the shaft 39, and the driven arm 13 further drives the drop step 10 to retract in an upward inclined manner until the driving arm 12 engages the driving arm position stopper 11, at which time rotation of the motor 2 ceases.

FIGS. 23-29 show a second exemplary embodiment of the invention, which differs from the embodiment of FIGS. 1-22 in that it includes an alternative drop step guiding and positioning mechanism, best shown in FIG. 25. Parts of the second exemplary embodiment that are identical to corresponding parts of the first preferred embodiment are designated by the same reference numerals as used in FIGS. 1-22. However, it will be appreciated that the two drop step guiding and positioning mechanisms are not required to be identical, and that each may include parts of different shapes, dimensions, or functions.

In this embodiment, the left hinge block 26 and the right hinge block 28 are again set at a 40° angle relative to the horizontal plane, ensuring that when the drop step 10 extends or retracts, its trajectory is fixed. The drop step 10 extends downwards at the 40° angle, and also retracts upwards at the 40° angle, with the top surface of the drop step 10 always being parallel to the horizontal plane. As in the first exemplary embodiment, the movement angle of the drop step 10 may be varied. Also, as in the first exemplary embodiment of the invention, users may be enabled to set different heights for the extension of the drop step 10, and to record their preferences via the automotive electronic control unit 31's memory function, and a distance sensor 34 may be included to detect interference with extension of the drop step 10, and promptly stop the extension or retract the drop step if an obstacle is present.

Similarly to the first exemplary embodiment, the power transmission mechanism of this embodiment includes an electric motor 2, driving arm 12, driven arm 13, driving side base 14, and connecting shaft 15. The electric motor 2 is installed on one side of the driving side base 14 and is connected to the driving arm 12, so that it rotates driving arm 12 and driven arm 13 in a first direction to extend the drop step 10 along the inclined linear path defined by a guiding mechanism, and in a second direction to retract the drop step 10 along the same inclined linear path. However, the guiding mechanism of this embodiment has a different structure than the guiding mechanism the first exemplary embodiment.

In particular, the guiding and positioning arrangement of this exemplary embodiment consists of fixed stop pins 22, moving stop pins 23, a guide member 24, and the driving arm position stopper 11. The fixed stop pins 22 and elongated guide member 24 are secured to the driving and driven side base plates 14,21 while the moving stop pins 23 extend from a sliding upper part or extension 40 of drop step 10. When the drop step 10 needs to extend downward in a slanted manner, the power shaft of the electric motor 2 rotates clockwise, pushing the driving arm 12 to rotate clockwise. This movement pushes the driven arm 13 and the drop step 10 to extend downward in a slanted or inclined manner. At the same time, the moving stop pins 23 on the drop step 10 move with the drop step 10 in a diagonally downward direction along the positioning track 24. When the moving stop pins 23 comes into contact with each fixed stop pins 22, the drop step 10 stops moving and reaches the final extended position, thus achieving a stable extension trajectory, and ensuring correct positioning when the step is in the extended position. In the extended position, any load on the step is borne by fixed stop pins 22 and driving side base plates 14 or driven side base plates 21, via moving stop pins 23 which rest on the fixed stop pins 22.

When the drop step 10 needs to retract upward in an inclined or slanted manner, the power shaft of the electric motor 2 reverses, causing the driving arm 12 to rotate in the opposite direction from the rotation direction used during extension of the drop step 10. This movement causes the driven arm 13 and the drop step 10 to retract upward in a slanted manner. At the same time, the moving stop pins 23 on the drop step 10 retract diagonally upward along the guide member 24. When the driving arm 12 touches the driving arm position stopper 11, the driving arm 12 stops rotating, and the drop step 10 retracts to the closed position. As with the first exemplary embodiment, the angle between the guide member 24, which serves as a guide track for the sliding part of the drop step 10, and the horizontal plane is the same as the angle between the hinge blocks and the horizontal plane. By way of example and not limitation, this angle may be 40°.

The control system for this exemplary embodiment may be the same as for the first exemplary embodiment, as may the operation of the extension and guiding mechanisms. Replacement of the track, sliding guide block, and limit stop of the first exemplary embodiment by guide member 24, and complementary fixed pins 22 and moving pints 23 of the second exemplary embodiment should have no effect on the operation of the drop step assembly. Once again, the control system may include motor wiring kit 30, automotive electronic control unit 31, mobile app 32, in-vehicle Infotainment system 33, and distance sensor 34.

Although preferred embodiments of the invention have been described in connection with the appended drawings, it will be appreciated by those skilled in the art that the description of the preferred embodiments is not intended to be limiting. For example, while an exclusively linear inclined path will generally provide smoother and more reliable operation, it is possible to construct the guiding mechanism so that the step follows a path that is not strictly linear. Also, the principles of the invention can be applied to dual step arrangement that includes separate motors that are not required to operate in a synchronous manner. As a result, it is intended that modifications of the preferred embodiments may be made without departing from the scope of the invention, which should be limited solely by the appended claims

What is claimed is:

1. An electric powered step assembly for a vehicle, comprising:

a support for securing the electric powered step assembly to the vehicle;

a drop step;

a motor fixed to the support;

a guide track or positioning guide member fixed to the support for guiding the drop step along a linear path from a retracted to an extended position and back;

a limit stop fixed to the guide track or the support;

a mechanism for transmitting torque from the motor to the drop step, to cause the drop step to move along the linear path from a retracted position to an extended position and from the extended position to the retracted position; and a pair of lateral guides connected between a support and respective left and right sides of the drop step, wherein the linear path is at an inclined, non-zero angle relative to horizontal, wherein the drop step is fixedly connected to at least one limit stop engaging member that slides along the linear path and engages the limit stop to define the extended position of the drop step and to bear any load on the drop step in the extended position.

2. An electric powered step assembly as claimed in claim 1, wherein the mechanism for transmitting torque to the drop step is a crank mechanism that includes a driving arm and a driven arm, wherein a first end of the driving arm is coupled to and driven by a rotating shaft of the motor, wherein a second end of the driving arm is pivotally connected to a first end of the driven arm, and wherein a second end of the driven arm is pivotally coupled to the drop step.

3. An electric powered step assembly as claimed in claim 1, wherein the limit stop engaging member is a slide block projects from the drop step, or from an upwardly and rearwardly extension of the drop step, to engage the limit stop and position the drop step at the extended position.

4. An electric powered step assembly as claimed in claim 3, wherein the linear path is defined by at least one guide rod mounted in the track, said at least one slide block slidably receiving the at least one guide rod such that the slide block slides along and is guided by the at least one guide rod.

5. An electric powered step assembly as claimed in claim 1, wherein the limit stop includes at least one fixed pin extending from a base plate fixed to the main support bar, and wherein at least one corresponding moving pin extends from and is movable with the drop step to engage the at least one fixed pin and bear any loads on the drop step when the drop step is in the extended position.

6. An electric powered step assembly as claimed in claim 1, wherein the inclined, non-zero angle is a 40° angle.

7. An electric powered step assembly as claimed in claim 1, further comprising driving arm position stopper situated in a path of movement of the driving arm, to define a retracted position of the drop step as a position in which the driving arm engages the driving arm position stopper.

8. An electric powered step assembly as claimed in claim 1, wherein each lateral guide includes a cylinder rod coupled at one end to a support member by a pivot joint, wherein a second end of the cylinder rod extends into and is slidable relative to a guide cylinder, and wherein the guide cylinder is coupled by another pivot joint to the drop step.

9. An electric powered step assembly as claimed in claim 1, wherein the motor is driven in a first direction to extend the drop step, and in a second direction opposite the first direction to retract the drop step.

10. An electric powered step assembly as claimed in claim 1, wherein a number of drop steps is two, and one said track or positioning guide member and one said crank mechanism is provided for each drop step, and wherein the second crank mechanism is driven by said motor by a shaft extending between the first crank mechanism and the second crank mechanism to enable synchronous extension and retraction of the two steps.

11. An electric powered step assembly as claimed in claim 1, wherein the motor is driven by a controller connected to an electronic control unit included in an infotainment system of the vehicle such that retraction and extension may be activated by a key fob or app.

12. An electric powered step assembly for a vehicle, comprising:

a main support for securing the electric powered step assembly to the vehicle;

a drop step;

a motor fixed to the support;

a power transmission mechanism for transmitting power from the motor to cause the drop step to move along an inclined path between a retracted position and an extended position, and between the extended position and the retracted position, a guiding mechanism for guiding the drop step along the inclined path, wherein the motor is connected to an electronic control unit of the vehicle, wherein the electronic control unit is configured to cause the motor to rotate in a first direction to move the drop step to the extended position, and to rotate in a second direction to move the drop step to the retracted position, and wherein the drop step is supported in the extended position by a load-bearing fixed limit stop.

13. An electric powered step assembly as claimed in claim 12, wherein the inclined path is linear and inclined at a 40° angle relative to horizontal.

14. An electric powered step assembly as claimed in claim 12, wherein at least one slide block projects from the drop step, or an upwardly and rearwardly extension of the drop step, to engage the load-bearing fixed limit stop and position the drop step at the extended position.

15. An electric powered step assembly as claimed in claim 14, wherein the load-bearing fixed limit stop is fixed to a base plate, the base plate extending from a main support bar secured to the vehicle.

16. An electric powered step assembly as claimed in claim 14, wherein the inclined path is defined by at least one guide rod mounted in a track, and wherein the at least one slide block slidably receives the at least one guide rod such that the slide block slides along and is guided by the at least one guide rod.

17. An electric powered step assembly as claimed in claim 12, wherein the limit stop includes a pair of fixed pins extending from a base plate fixed to the main support bar, and wherein a corresponding pair of moving pins extends from and is movable with the drop step to engage the fixed pins and bear any loads on the drop step when the drop step is in the extended position.

18. An electric powered step as claimed in claim 12, wherein the electronic control unit is configured to cause the motor to rotate in a first direction to move the drop step to the extended position, and to rotate in a second direction to move the drop step to the retracted position.

* * * * *